United States Patent
Hasegawa et al.

(10) Patent No.: US 12,203,806 B2
(45) Date of Patent: Jan. 21, 2025

(54) SUNSHINE RECORDER AND SUNSHINE MEASUREMENT METHOD

(71) Applicant: EKO INSTRUMENTS CO., LTD., Tokyo (JP)

(72) Inventors: Toshikazu Hasegawa, Tokyo (JP); Kees Hoogendijk, Tokyo (JP); Mario Po, Tokyo (JP); Isamu Chiba, Tokyo (JP)

(73) Assignee: EKO INSTRUMENTS CO., LTD., Tokyo (JP)

( * ) Notice: Subject to any disclaimer, the term of this patent is extended or adjusted under 35 U.S.C. 154(b) by 0 days.

(21) Appl. No.: 18/578,107

(22) PCT Filed: Mar. 1, 2022

(86) PCT No.: PCT/JP2022/008521
§ 371 (c)(1),
(2) Date: Jan. 10, 2024

(87) PCT Pub. No.: WO2023/286323
PCT Pub. Date: Jan. 19, 2023

(65) Prior Publication Data
US 2024/0319005 A1 Sep. 26, 2024

(30) Foreign Application Priority Data
Jul. 16, 2021 (JP) ................. 2021-118100

(51) Int. Cl.
*G01J 1/42* (2006.01)
*G01J 1/04* (2006.01)
(Continued)

(52) U.S. Cl.
CPC ........... *G01J 1/4204* (2013.01); *G01J 1/4228* (2013.01); *G01J 1/0411* (2013.01); *G01J 1/16* (2013.01);
(Continued)

(58) Field of Classification Search
CPC ................. G01J 1/4204; G01W 1/12
See application file for complete search history.

(56) References Cited

U.S. PATENT DOCUMENTS

| | | | |
|---|---|---|---|
| 2012/0314410 A1* | 12/2012 | Leard | G01N 21/255 362/257 |
| 2020/0116836 A1* | 4/2020 | Pacala | H01L 27/14645 |
| 2022/0349756 A1* | 11/2022 | Okumura | G01J 5/027 |

FOREIGN PATENT DOCUMENTS

| | | |
|---|---|---|
| CN | 112665717 | 4/2021 |
| JP | 2001-91353 | 4/2001 |

(Continued)

OTHER PUBLICATIONS

International Search Report issued in International Patent Application No. PCT/JP2022/008521, dated May 17, 2022.

*Primary Examiner* — Tony Ko
(74) *Attorney, Agent, or Firm* — GREENBLUM & BERNSTEIN, P.L.C.

(57) ABSTRACT

A sunshine recorder has: a lens that emits, as projection light, natural light incident from half of the celestial sphere; a sensor that photoelectrically converts the projection light projected onto a light receiving surface, and outputs the photoelectrically converted projection light; and a determination circuit that determines the presence or absence of sunshine on the basis of an output of the sensor, wherein the sensor has a plurality of detection areas on the light receiving surface and is configured to output a signal corresponding to the intensity of the projection light incident on each of the detection areas, and the determination circuit removes a scattered light component included in the projection light on the basis of a difference operation of the signal output from each of the detection areas to extract only a direct light component to be included in the projection light at the time of incidence of sunlight.

8 Claims, 16 Drawing Sheets

(51) Int. Cl.
  *G01J 1/16* (2006.01)
  *G01W 1/12* (2006.01)
(52) U.S. Cl.
  CPC ........ *G01J 2001/4266* (2013.01); *G01W 1/12* (2013.01)

(56) References Cited

FOREIGN PATENT DOCUMENTS

| | | |
|---|---|---|
| JP | 2002-286545 | 10/2002 |
| JP | 2003-21688 | 1/2003 |
| JP | 2005-77215 | 3/2005 |
| JP | 2014-224346 | 12/2014 |

* cited by examiner

Fig. 7

| Q1 | Q2 | Q3 | Q4 | |Q1-Q2| | |Q1-Q3| | |Q1-Q4| | |Q2-Q3| | |Q2-Q4| | |Q3-Q4| | MAX. VALUE OF DIFFERENCE | DETERMINATION OF SUNSHINE |
|---|---|---|---|---|---|---|---|---|---|---|---|
| 9.5 | 0.7 | 0.9 | 0.8 | 8.8 | 8.6 | 8.7 | 0.2 | 0.1 | 0.1 | 8.8 | SUNSHINE |
| 0.2 | 0.5 | 0.3 | 0.4 | 0.3 | 0.1 | 0.2 | 0.2 | 0.1 | 0.1 | 0.3 | NO SUNSHINE |

Fig. 10

| Q1 | Q2 | Q3 | Q4 | Q1+Q2 | Q3+Q4 | Δ1 | Q1+Q4 | Q2+Q3 | Δ2 | DETERMINATION DIFFERENCE | DETERMINATION OF SUNSHINE |
|---|---|---|---|---|---|---|---|---|---|---|---|
| 9.5 | 0.7 | 0.9 | 0.8 | 10.2 | 1.7 | 0.71 | 10.3 | 1.6 | 0.73 | 0.73 | SUNSHINE |
| 4.8 | 0.5 | 0.6 | 4.8 | 5.3 | 5.4 | 0.01 | 9.6 | 1.1 | 0.79 | 0.79 | SUNSHINE |
| 4.8 | 4.8 | 0.5 | 0.6 | 9.6 | 1.1 | 0.79 | 5.4 | 5.3 | 0.01 | 0.79 | SUNSHINE |
| 0.6 | 4.8 | 4.8 | 0.5 | 5.4 | 5.3 | 0.01 | 1.1 | 9.6 | 0.79 | 0.79 | SUNSHINE |
| 0.5 | 0.6 | 4.8 | 4.8 | 1.1 | 9.6 | 0.79 | 5.4 | 5.3 | 0.01 | 0.79 | SUNSHINE |
| 0.2 | 0.5 | 0.3 | 0.4 | 0.7 | 0.7 | 0.00 | 0.6 | 0.8 | 0.14 | 0.14 | NO SUNSHINE |

Fig. 12
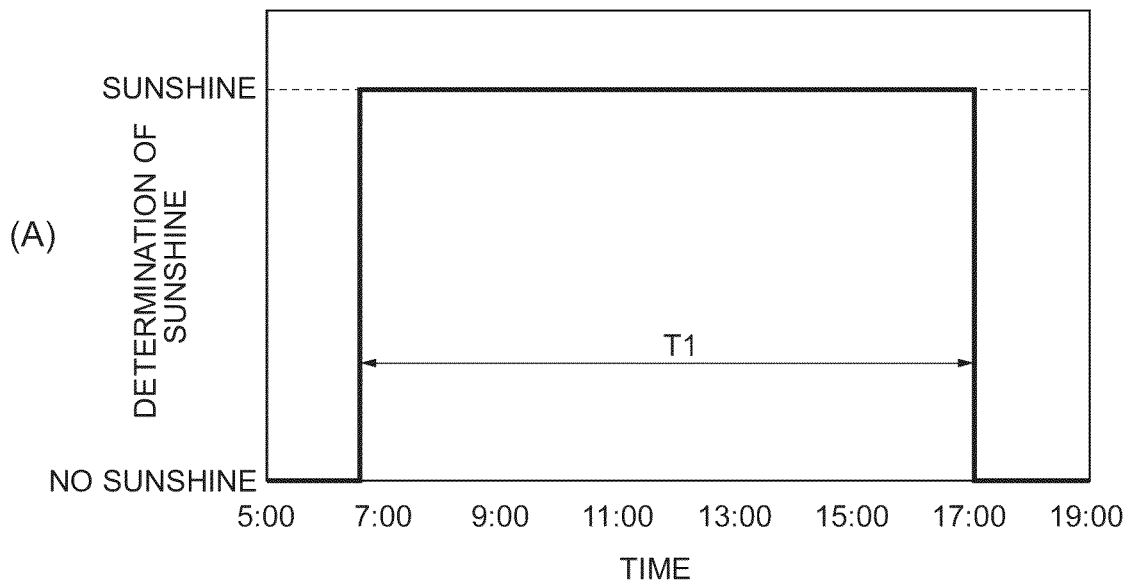
(A)
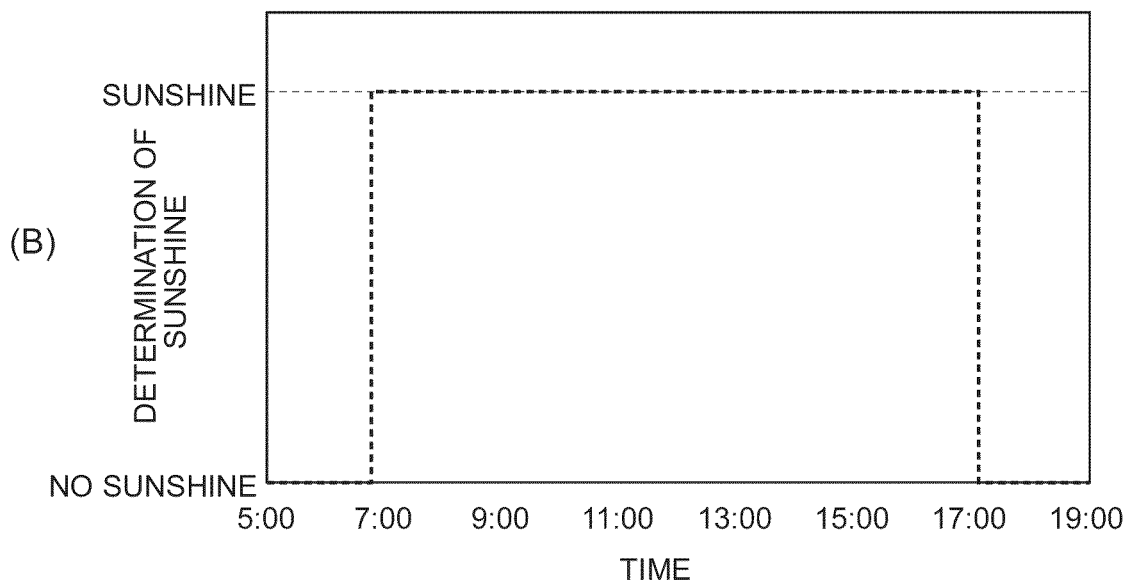
(B)

Fig. 13
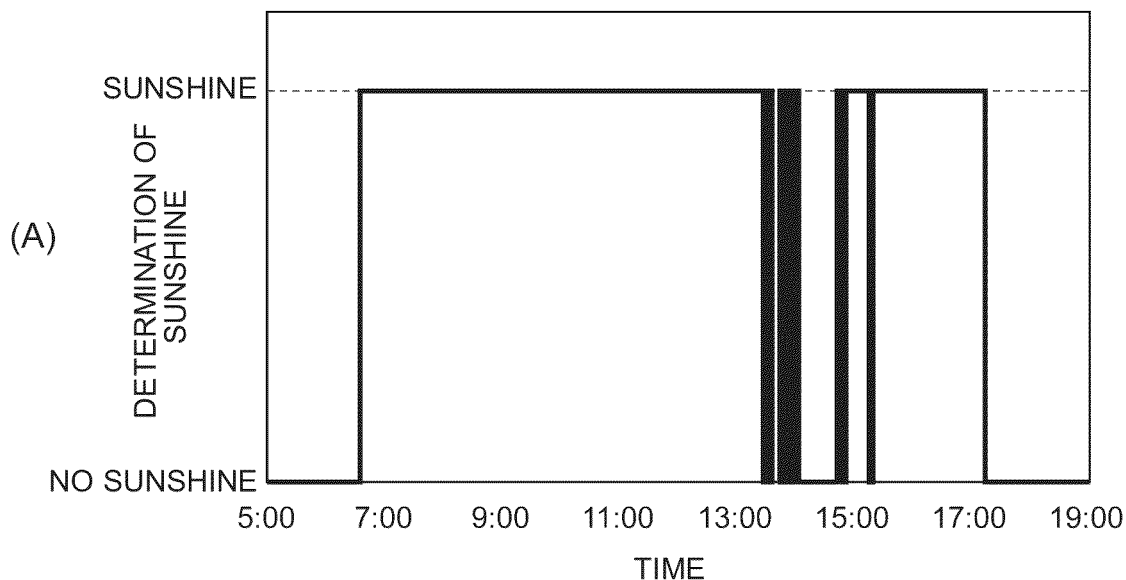
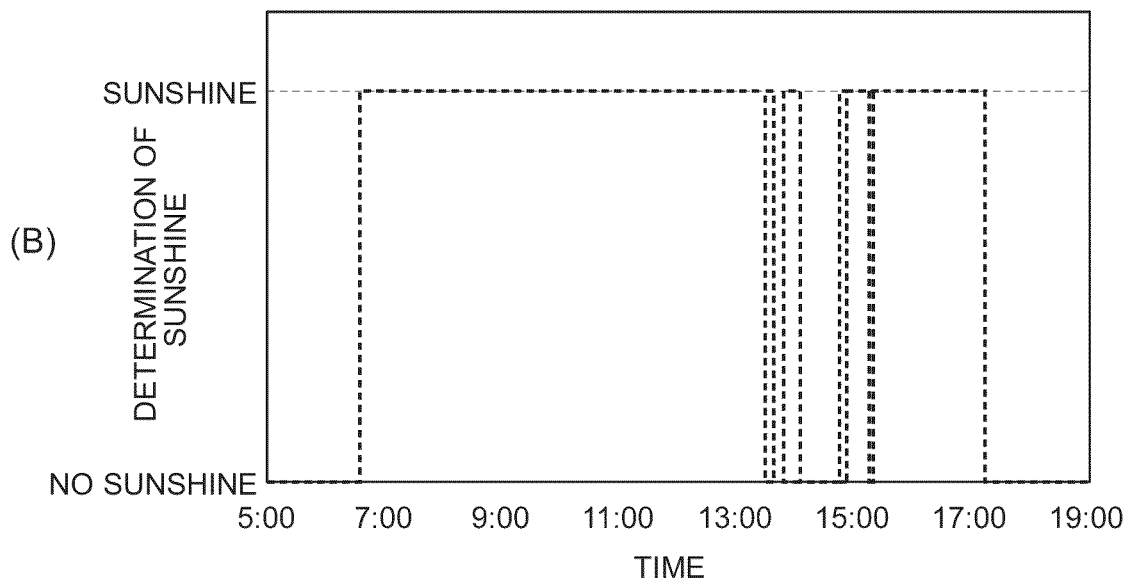

SUNSHINE RECORDER AND SUNSHINE MEASUREMENT METHOD

TECHNICAL FIELD

The present invention relates to a sunshine recorder and a sunshine measurement method.

BACKGROUND ART

A measurement device called a sunshine recorder is used to measure the irradiation of sunlight on the Earth's surface. Types of sunshine recorders include rotary sunshine recorders and photoelectric sunshine recorders. Furthermore, a direct pyrheliometer can be mounted on a solar tracking device to measure sunshine. Natural light arriving from the sky hemisphere during the daytime includes direct light, which is sunlight passing through the atmosphere and directly irradiating the Earth's surface, and scattered light, which is sunlight scattering in the atmosphere and irradiating the Earth's surface. The sunshine recorder determines the presence or absence of sunshine based on the intensity of direct light out of the two types mentioned above. For example, a predetermined threshold value is set for direct solar radiation intensity corresponding to direct light. When direct solar radiation intensity exceeds the threshold value and is input to the sunshine recorder, the recorder outputs a signal determining that there is 'sunshine.' According to the definition by the World Meteorological Organization, sunshine duration is the time during which the direct solar radiation intensity (solar radiation from a 2.5-degree half-angle field of view centered on the sun) exceeds 120 W/m². In actual operation, sunshine duration is defined as the time during which the direct solar radiation intensity is 120 W/m² or more.

Enhancing the precision of measuring direct light and scattered light can significantly improve the accuracy in determining the presence or absence of sunshine. For example, Patent Document 1 describes a sunshine recorder that reduces the measurement errors of direct light and scattered light even when scattered light varies irregularly. In the sunshine recorder (measurement device) described in Patent Document 1, a thermocouple that detects light incident through a first slit, and a thermocouple that detects light incident through a second slit are provided in cylindrical glass. This sunshine recorder is equipped with both a first and a second slit, ensuring that direct light selectively falls on one of the two thermocouples. This design allows for the detection of direct light exclusively, without interference from scattered light.

CITATION LIST

Patent Document

Patent Document 1: Japanese Unexamined Patent Application Publication No. 2005-77215

SUMMARY OF INVENTION

Technical Problem

However, the sunshine recorder described in Patent Document 1 necessitates glass and slit processing, as well as a plurality of sensors for measurement, resulting in a complex device. Moreover, in conventional sunshine recorders, including the one detailed in Patent Document 1, the installation angles and orientations need adjustment based on the latitudes of the installation locations. Additionally, in other traditional sunshine recorders, variations in the sun's position due to seasonal changes (declination) may lead to measurement errors in direct light intensity.

Furthermore, employing a method where a direct pyrheliometer is mounted on a solar tracking device for sunshine measurement involves numerous devices, resulting in high costs and a large-scale system. In the case of a rotary sunshine recorder, a movable component is essential to capture reflections from a metal mirror rotating in a glass tube, introducing a complex configuration. Consequently, the need for adjustments during installation poses challenges for straightforward measurements. Moreover, the presence of a movable component as an additional element for a sunshine recorder may compromise its durability.

Therefore, an object of the present invention is to provide a sunshine recorder that has no movable component and permits easy adjustment for measurement.

Solution to Problem

A sunshine recorder according to an aspect of the present invention has: a lens that emits, as projection light, natural light incident from half of the celestial sphere; a sensor that photoelectrically converts the projection light projected on a light receiving surface and outputs the photoelectrically converted projection light; and a determination circuit that determines the presence or absence of sunshine on the basis of an output of the sensor, wherein the sensor has a plurality of detection areas on the light receiving surface and is configured to output a signal corresponding to an intensity of the projection light incident on each of the detection areas, and the determination circuit removes a scattered light component included in the projection light on the basis of a difference operation of the signal output from each of the detection areas to extract only a direct light component to be included in the projection light at the time of incidence of sunlight, thereby determining the presence or absence of sunshine in natural light.

According to this aspect, all the light from the half of the celestial sphere is projected onto the light receiving surface of the sensor as the projection light, so that all the direct light and the scattered light included in natural light are detected by the sensor. Then, the determination circuit performs the difference operation for the signals output from the detection elements, so that the scattered light component included in the projection light is removed and only the direct light component is taken out. Thus, the sunshine recorder in this particular aspect enables the determination of sunshine presence or absence without being influenced by the change of the sun's position in the sky, eliminating the necessity for a movable component. Moreover, there is no requirement to align the orientation of the sunshine recorder based on the latitude of the installation location. Additionally, it is feasible to mitigate measurement errors in the direct light intensity caused by variations in declination. Consequently, the sunshine recorder in this particular aspect is absent of a movable components and allows straightforward adjustments for measurement.

Further, the determination circuit may determine that there is sunshine in the case where the maximum value of the difference between the signals output from the detection areas satisfies a predetermined threshold value. In this aspect, even when there are a plurality of differences, proper determination is accomplished by using a maximum value in determining the presence or absence of sunshine.

Further, in the above-described aspect, the sensor has four detection areas, and the determination circuit may determine the presence or absence of sunshine by mutually comparing the difference between the sum of signals from the detection areas provided side by side in a predetermined first direction and the sum of signals from the detection areas provided side by side in a second direction orthogonal to the first direction.

According to this aspect, as compared with, for example, a case where the sensor has only two detection areas, the difference between signals can be mutually compared so as to determine the presence or absence of sunshine on the basis of a direct light component even when the direct light is positioned between the detection areas.

Further, the determination circuit may output determination signals indicating the presence or absence of sunshine. According to this aspect, an external device can perform sunshine recording by using the sunshine recorder.

In addition, the determination circuit may further refer to a predetermined calibration value to determine the presence or absence of sunshine. This aspect makes it possible to determine the presence or absence of sunshine by including a calibration value based on the environment of the sunshine recorder, thus permitting determination of the presence or absence of sunshine with higher accuracy.

A sunshine measurement method according to another aspect of the present invention includes: a step of emitting, as projection light, natural light incident from half of the celestial sphere; a step of outputting signals corresponding to intensities of projection light incident on a plurality of detection areas on a light receiving surface for the projection light; and a step of determining the presence or absence of sunshine in the natural light by removing a scattered light component included in the projection light on the basis of a difference operation of the signals output from the detection areas so as to extract only a direct light component to be included in the projection light at the time of incidence of sunlight.

Advantageous Effects of Invention

According to the present invention, a sunshine recorder that has no movable component, and it permits easy adjustment for measurement without any need of calibration.

BRIEF DESCRIPTION OF DRAWINGS

FIG. 7 is a diagram illustrating the processing in the determination circuit according to the first embodiment.

FIG. 10 is a diagram illustrating the processing in the determination circuit according to the second embodiment.

FIG. 12 presents diagrams illustrating the results of determination of the presence or absence of sunshine by the determination circuit according to the second embodiment.

FIG. 13 presents diagrams illustrating other results of determination of the presence or absence of sunshine by the determination circuit according to the second embodiment.

DESCRIPTION OF EMBODIMENTS

Figure 1:
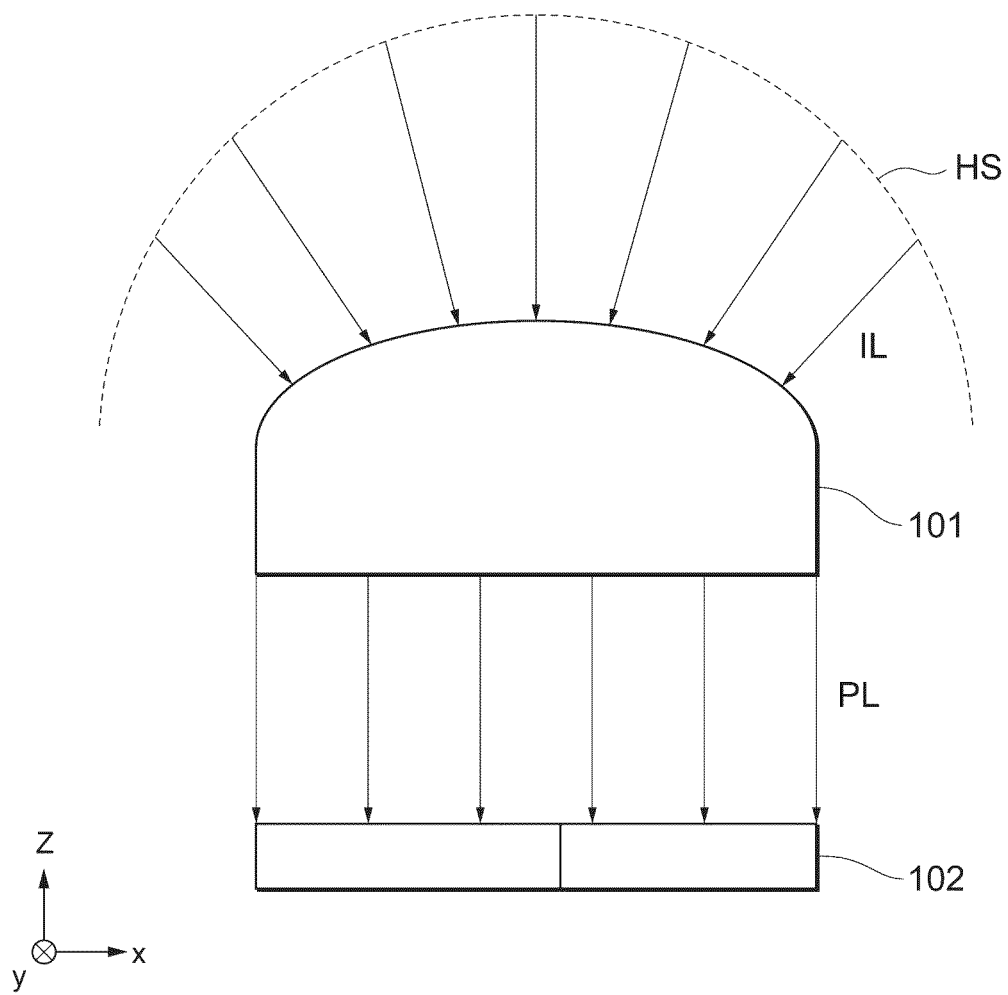
FIG. 1 is a schematic diagram illustrating the principle of measurement by a sunshine recorder.

Referring to the accompanying drawings, preferred embodiments of the present invention will be described. In the drawings, components with the same reference signs have the same or similar configurations.

Description of the Principle

Figure 2:
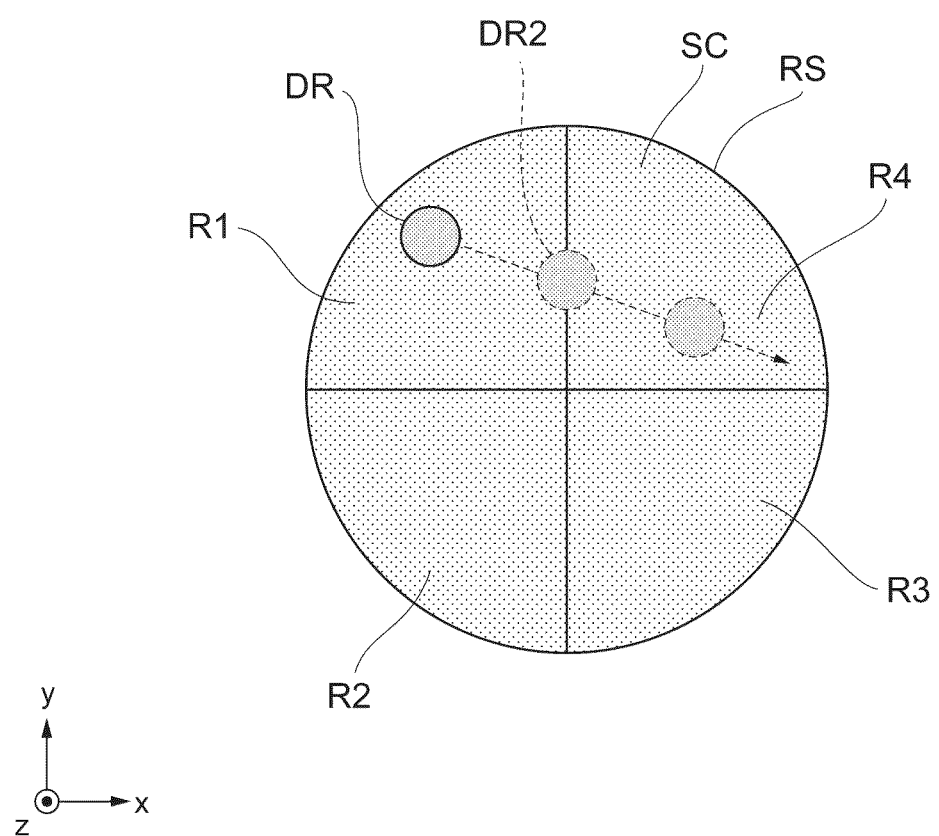
FIG. 2 is a schematic diagram illustrating sunshine and the movement thereof over time to explain the principle of measurement by the sunshine recorder.

Referring first to FIG. 1 and FIG. 2, the first determination principle for the presence or absence of sunshine by a sunshine recorder according to the present embodiment will be described. FIG. 1 is a diagram schematically illustrating, from the side, a lens and a sensor in accordance with the present invention. FIG. 1 illustrates a situation in which natural light IL, which is sunlight, is incident on a lens 101 from half of the celestial sphere HS, and projection light PJ is emitted to a sensor 102 from the lens 101.

The lens 101 is an objective lens that refracts the natural light IL such that the natural light IL is irradiated as the projection light PL along a z-axis to the lower side in the z-axis direction illustrated in FIG. 1 (in the following description, the positive direction of the x-y-z axes will be referred to as the "upper side" and the negative direction of the axes as the "lower side"). The lens 101 is a convex lens having a wide incident angle, e.g., a fisheye lens. The lens 101 may be composed of a plurality of lenses. The lens 101 is an optical element configured to be capable of collecting light from half of the celestial sphere HS to enable observation of half of the celestial sphere HS. The natural light IL incident from half of the celestial sphere HS is converted into parallel light rays through the lens 101, and projected as the projection light PL to the light receiving surface of the sensor 102. In other words, the planar projection image of half of the celestial sphere HS is formed on the light receiving surface of the sensor 102 by the projection light PL. The sensor 102 photoelectrically converts the projection light PL, and outputs a signal (electrical signal) corresponding to the intensity of the light received by the sensor 102. The sensor 102 has a plurality of detection areas (refer to FIG. 2).

The natural light IL includes the direct light from the sun and the scattered light from the space of half of the celestial sphere HS. Consequently, the projection light PL forming the planar projection image of the natural light IL includes direct light components corresponding to the direct light of the sun and scattered light components corresponding to the scattered light from the space of half of the celestial sphere HS.

FIG. 2 is a plan view illustrating a planar projection image of the projection light PL projected onto a light receiving surface RS of the sensor 102. The light receiving surface RS is divided into detection areas R1, R2, R3, and R4. The sensor 102 outputs signals according to the intensity of projection light projected onto each of the detection areas R1, R2, R3, and R4. For example, each signal is a voltage signal having an amplitude value corresponding to the intensity of projection light. In FIG. 2, direct light is shown as the light projected onto an area DR of the detection area R1. Scattered light is shown as the light in an area SC. The area SC showing the scattered light is the entire area covering the detection areas R1, R2, R3, and R4.

As the sun moves with the lapse of time, in the planar projection image formed on the light receiving surface RS, the direct light moves along the dashed line in FIG. 2 from the area DR in the direction of the arrow in the light receiving surface RS.

In FIG. 2, first, the signal from the detection area R1 becomes a signal corresponding to the intensity of a light component obtained by combining the direct light component of the direct light positioned in the area DR and the scattered light component of the scattered light therearound. Further, the signal from the detection area R4 becomes a signal corresponding to the intensity of only the scattered light component. Therefore, the signal of the direct light component required for determining the presence or absence of sunshine can be obtained by removing the scattered light component by performing the difference calculation in which the signal from the detection area R4 is subtracted from the signal from the detection area R1. Then, the presence or absence of sunshine can be determined on the basis of the obtained signal of the direct light component. This applies also to the case where the signal of the detection area R2 or R3 is used in place of the detection area R4. Consequently, the presence or absence of sunshine can be determined by performing the difference calculation of two signals from a plurality of detection areas for all combinations, and by comparing a difference indicating a maximum value among the plurality of differences with a predetermined threshold value. This is because the fact that the difference shows the maximum value means that the direct light component with the highest light quantity is included in one of the detection areas subjected to the difference calculation. A specific application example according to this first determination principle will be described later in the first embodiment. The calculations for determining the presence or absence of sunshine according to the above-described first measurement principle and the following second measurement principle will be generically referred to also as "difference operation" in the present specification.

Meanwhile, it is assumed that the sun has moved and the direct light projected onto the light receiving surface RS is now projected onto the position illustrated in the area DR2 of FIG. 2. In this case, the direct light is inconveniently projected, being bisected onto the detection area R1 and the detection area R4. With the direct light at such a position, the signal from the detection area R1 becomes a signal based on the intensity of a light component combining a half of the direct light component and scattered light component. Further, the signal from the detection area R4 becomes a signal based on the intensity of only a half of the direct light component and scattered light component. Consequently, the result of the difference calculation in which the signal from the detection area R4 is subtracted from the signal from the detection area R1 is a zero or approximately zero difference value. In other words, in the case where the position of the sun extends over the boundary of detection areas, a correct direct light component signal cannot be obtained.

Therefore, as a second measurement principle, differences among signals from the plurality of detection areas are compared with each other to determine the presence or absence of sunshine on the basis of direct light components. The following will describe the difference operation in detail.

Here, the signal from a detection area Rx (x being one of 1 to 4) is denoted by Qx, the signal is decomposed into a direct light component Dx and a scattered light component Sx, and the signal is considered as $Qx=Dx+Sx$. The direct light component is calculated by the following procedure (a) to (g).

(a) The signal Q1 from the detection area R1 and the signal Q4 from the detection area R4 are summed up to calculate the signal $Q1+Q4$ ($=D1+D4+S1+S4$).
(b) The signal Q2 from the detection area R2 and the signal Q3 from the detection area R3 are summed up to calculate the signal $Q2+Q3$ ($=D2+D3+S2+S3$).
(c) A first difference between the signal $Q1+Q4$ and the signal $Q2+Q3$ is calculated as an absolute value.
(d) The signal Q1 from the detection area R1 and the signal Q2 from the detection area R2 are summed up to calculate the signal $Q1+Q2$ ($=D1+D2+S1+S2$).
(e) The signal Q3 from the detection area R3 and the signal Q4 from the detection area R4 are summed up to calculate the signal $Q3+Q4$ ($=D3+D4+S3+S4$).
(f) A second difference between the signal $Q1+Q2$ and the signal $Q3+Q4$ is calculated as an absolute value.
(g) Of the first difference and the second difference, a difference having a larger absolute value is used as a determination difference, and the presence or absence of sunshine is determined on the basis of whether the determination difference is equal to or greater than a predetermined threshold value.

For example, under clear weather conditions, when the direct light is projected onto the position indicated in the area DR2 in FIG. 2, the direct light component is expressed by $D1=D4=d/2$, and the direct light component is expressed by $D2=D3=0$. Here, d denotes the direct light component of the entire direct light. Further, the scattered light component is expressed by $S1=S2=S3=S4=S$.

At this time, the first difference according to the step (c) is expressed by $D1+D4=d$. Further, the second difference according to the step (f) is expressed by $D1-D4=0$. Thus, the determination difference is d, making it possible to determine sunshine on the basis of the direct light component of the entire direct light. In other words, the presence or absence of sunshine can be properly determined, regardless of the position where the direct light is projected, by comparing with each other the difference between the sum of the signals from the detection areas (the detection areas R1+R4 and the detection areas R2+R3 arranged in the x-axis direction in the example of FIG. 2) provided side by side in the predetermined first direction (the x-axis direction in the example of FIG. 2) and the sum of the signals from the detection areas (the detection areas R1+R2 and the detection areas R4+R3 arranged in the y-axis direction in the example of FIG. 2) provided side by side in the second direction (the y-axis direction in the example of FIG. 2) orthogonal to the first direction. An application example according to the above-described second measurement principle will be described later in a second embodiment.

First Embodiment

Figure 3:
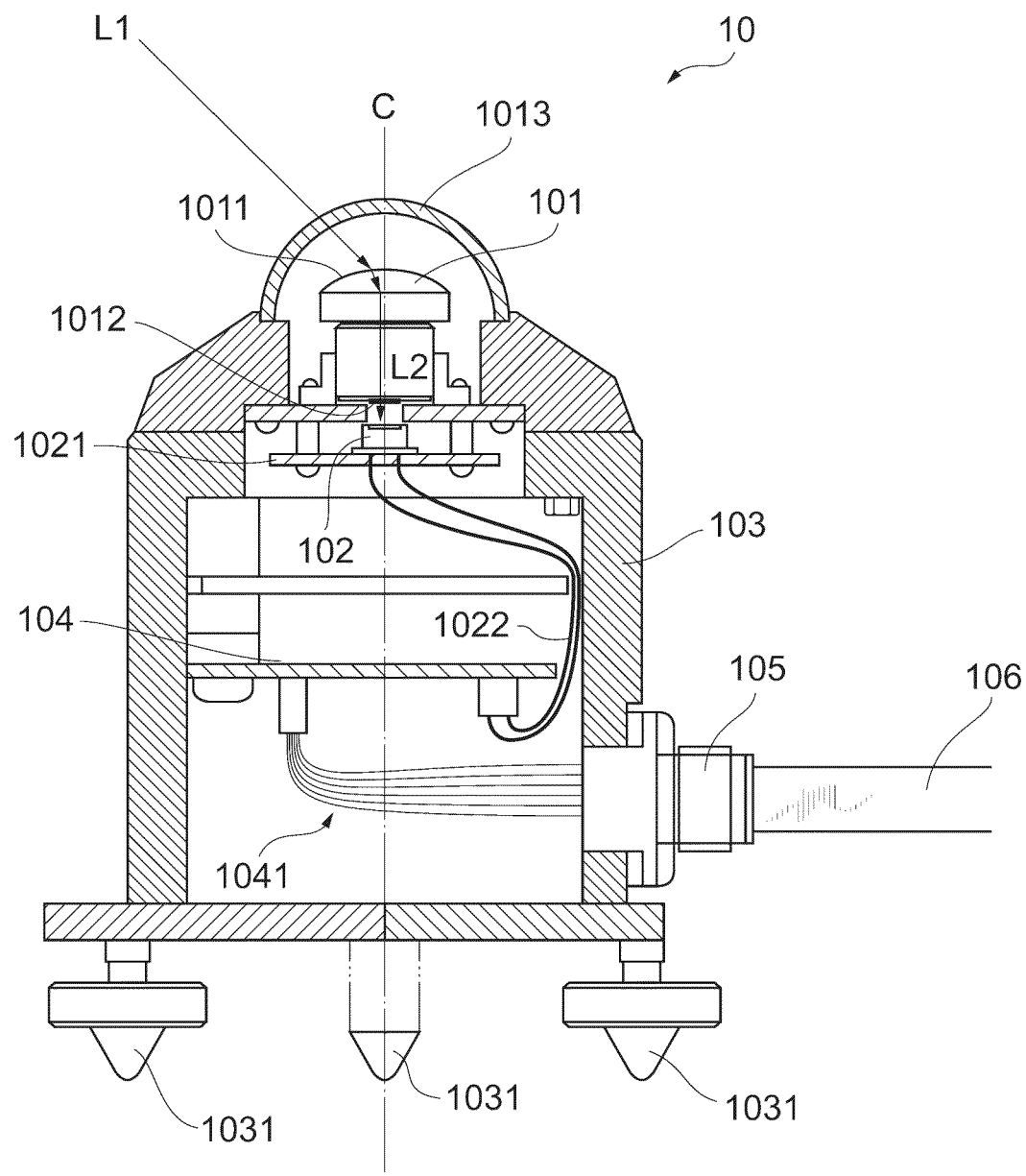
FIG. 3 is a sectional view of a sunshine recorder according to a first embodiment.

The following will describe a first embodiment based on the above-described first measurement principle. FIG. 3 is a sectional view of a sunshine recorder 10 according to the first embodiment, and illustrates the sectional surface of the sunshine recorder 10 cut along a central axis C. The sunshine recorder 10 includes a lens 101, a sensor 102, a housing 103, a determination circuit 104, and a connector 105. Further, in FIG. 3, a part of the natural light IL in FIG. 1 is indicated as natural light L1, and a part of the projection light PL is indicated as projection light L2. The lens and the sensor referred to in the description of the principle given above correspond to the lens 101 and the sensor 102, respectively, in the present embodiment.

The housing 103 is a cylindrical member having the central axis C as the axial center thereof. The housing 103 is formed of, for example, a metal material, which is a material physically and chemically resistant when installed outdoors. The housing 103 accommodates the lens 101, the sensor 102, and the determination circuit 104, which will be described later. The housing 103 has a plurality of legs 1031 at the lower side in a negative z-axis direction. The legs 1031 are members that make it possible to adjust the tilt of the housing 103 with respect to a ground contact surface.

The lens 101 is provided, being accommodated in the housing 103, on the upper side in the z-axis direction of the housing 103. The lens 101 has an incident surface 1011 and an emitting surface 1012. The lens 101 projects the natural light IL incident from the incident surface 1011 onto the sensor 102 as the projection light PL from the emitting surface 1012. In the housing 103, the lens 101 is provided at a position where the light from half of the celestial sphere can be condensed. The lens 101 is protected from external adhering matter by a cover 1013 provided on the housing 103. Further, the cover 1013 is formed of a glass material or the like, and is a protective member having light transparency leading to better cos (cosine) characteristics of the projection light PL.

The sensor 102 is provided below the lens 101 in the z-axis direction, facing the emitting surface 1012. The sensor 102 is provided on a sensor substrate 1021 connected to the housing 103. The sensor 102 is a photoelectric conversion sensor. For example, a semiconductor element is one of them. For example, the sensor 102 is a photodiode having a plurality of detection areas provided on the same surface. In the sensor 102, individual detection areas output individual signals. More specifically, the sensor 102 is a photodiode having four detection areas. The sensor 102 outputs the signals from the individual detection areas to outside through wiring 1022. The signals in this case are, for example, voltage signals having amplitude values corresponding to the intensities of received projection light.

The determination circuit 104 is provided below the sensor 102 in the z-axis direction in the form in which the substrate with the determination circuit 104 mounted thereon is connected to the housing 103. The determination circuit 104 is electrically connected to the sensor 102 through the wiring 1022. Based on a signal from the sensor 102, the determination circuit 104 determines whether the projection light PL has a light intensity that makes it possible to determine sunshine. The determination circuit 104 will be described in more detail later.

The determination circuit 104 outputs to outside a determination signal indicating the determination result obtained through the wiring 1041. The wiring 1041 is connected to the connector 105 provided on the housing 103. A cable 106 is connected to the connector 105. Through the cable 106, it is possible to supply power to the sunshine recorder 10, read the measurement results by the sunshine recorder 10, and write measurement setting by the sunshine recorder 10.

Figure 4:
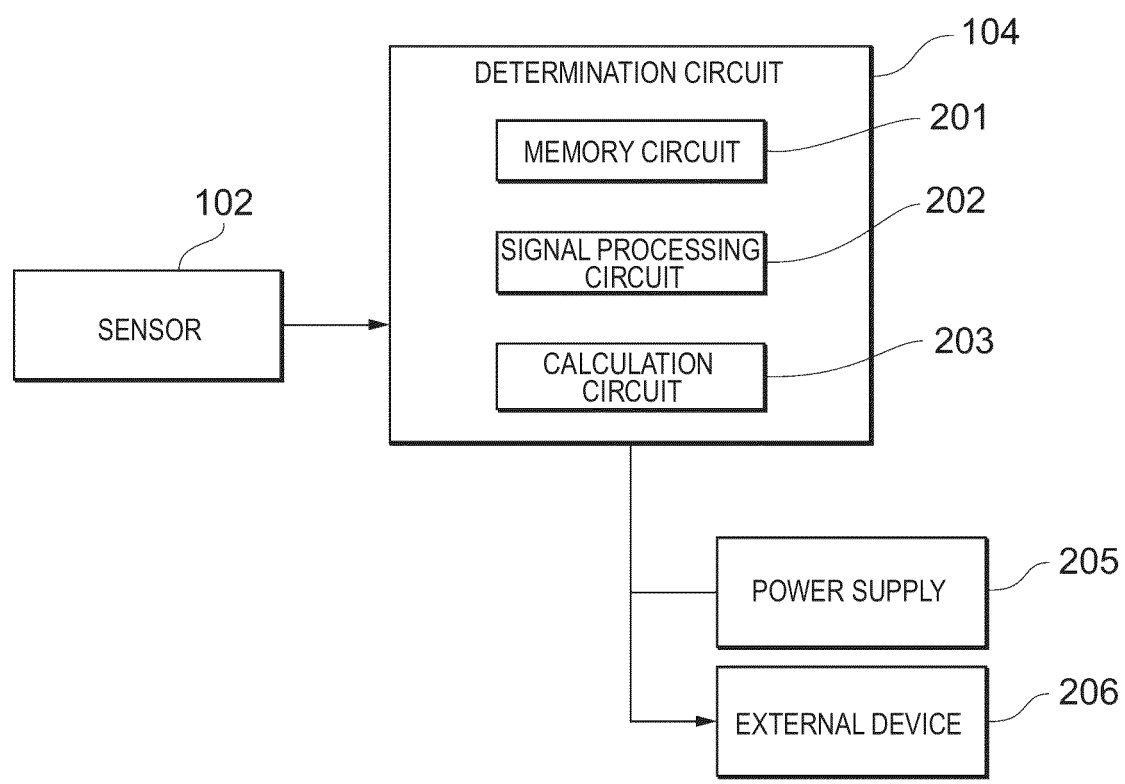
FIG. 4 is a block diagram illustrating a determination circuit according to the first embodiment.

The determination circuit 104 will be described with reference to FIG. 4. The determination circuit 104 has a memory circuit 201, a signal processing circuit 202, and a calculation circuit 203. The determination circuit 104 is implemented as a circuit in a microcomputer including the memory circuit 201 and the signal processing circuit 202. The calculation circuit 203 is a functional block implemented by the microcomputer executing a software program stored in the memory circuit 201.

The memory circuit 201 stores a software program for causing the microcomputer to perform the sunshine measurement method in accordance with the present invention, and also records various information used for signal processing by the determination circuit 104. The memory circuit 201 is a memory of the microcomputer. The memory circuit 201 stores program codes specifying the processing by the calculation circuit 203, and various threshold values used for determining whether the projection light PL indicates sunshine. The information stored in the memory circuit 201 may be made rewritable by an external device connected to the sunshine recorder 10 through the cable 106.

The signal processing circuit 202 is an A/D converter that converts signals as analog signals from the sensor 102 into digital signals.

The calculation circuit 203 uses the converted digital signals to perform difference operation for determining whether the projection light PL indicates sunshine. When it is determined that the projection light PL indicates sunshine, then the calculation circuit 203 stores the information indicating sunshine in the memory circuit 201. The calculation by the calculation circuit 203 will be described later.

The determination circuit 104 is connected to a power supply 205 and an external device 206. The power supply 205 supplies power to the sunshine recorder 10 including the determination circuit 104. The determination circuit 104 transmits determination results provided by the determination circuit 104 and the signals indicating sensor outputs to the external device 206. The external device 206 is, for example, a computer or a data logger. When the external device 206 is a computer or a data logger capable of digital communication, then the determination circuit 104 outputs converted digital signals to the external device 206. Alternatively, when the external device 206 is a data logger capable of reading analog values, then the determination circuit 104 outputs analog signals from the sensor 102 to the external device 206. The external device 206 can totalize the sunshine duration on the basis of a determination result from the determination circuit 104.

Figure 5:
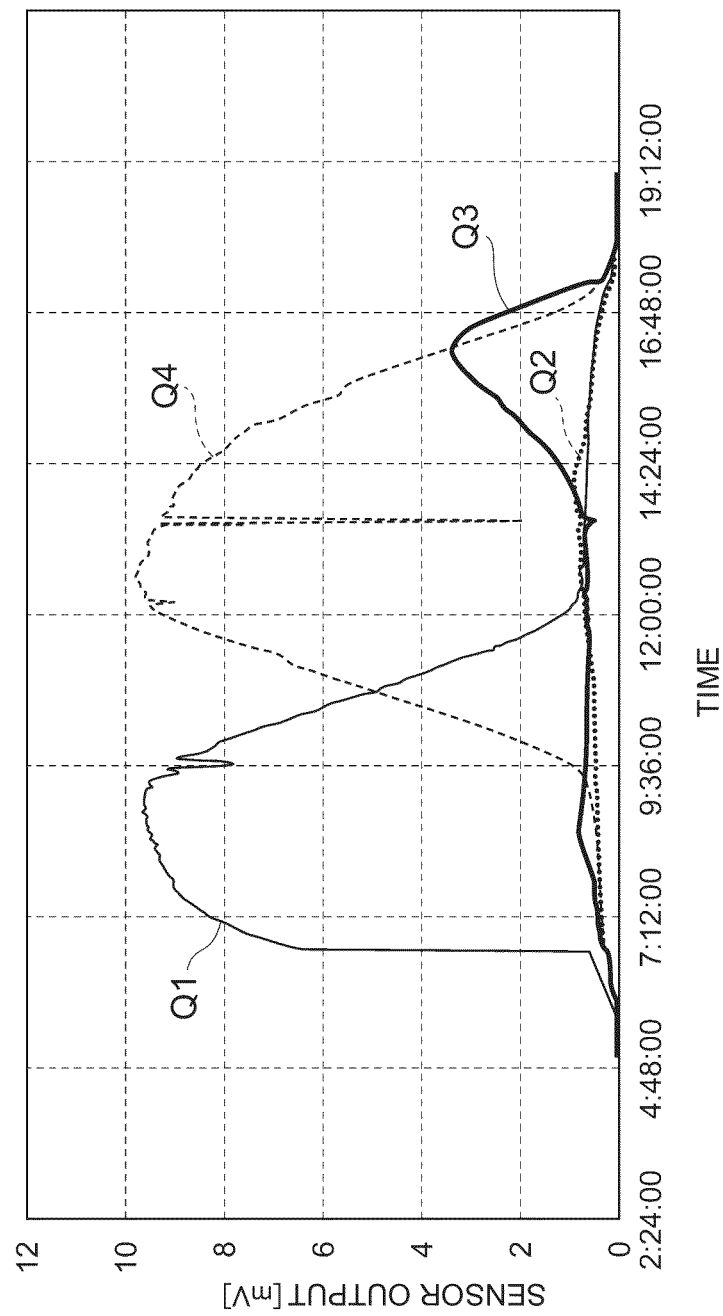
FIG. 5 is a diagram illustrating signals in a sensor according to the first embodiment.

FIG. 5 is an example graph plotting the signal from each detection area for a day when the weather is sunny. FIG. 5 illustrates the signal Q1 from the detection area R1, the signal Q2 from the detection area R2, the signal Q3 from the detection area R3, and the signal Q4 from the detection area R4.

In the morning, the signal Q1 from the detection area R1 is large, while the other signals Q2, Q3 and Q4 are small. This indicates that the area DR2 is positioned on the detection area R1. At this time, the signal Q1 includes a voltage component corresponding to both direct light and scattered light, and Q2, Q3 and Q4 include a voltage component corresponding to scattered light.

As time passes, the signal Q1 reduces, and the signal Q4 increases. This indicates that the area DR2 is moving from the detection area R1 onto the detection area R4. In the afternoon, the signal Q4 becomes large, and the other signals Q1, Q3 and Q4 become small. This indicates that the area DR2 is completely positioned on the detection area R4. FIG. 5 indicates that, as the sun moves, the area DR2 moves and the movement is detected. In addition, before the sunset, the signal Q3 slightly rises, indicating that the area DR2 is slightly reaching the detection area R3.

Figure 6:
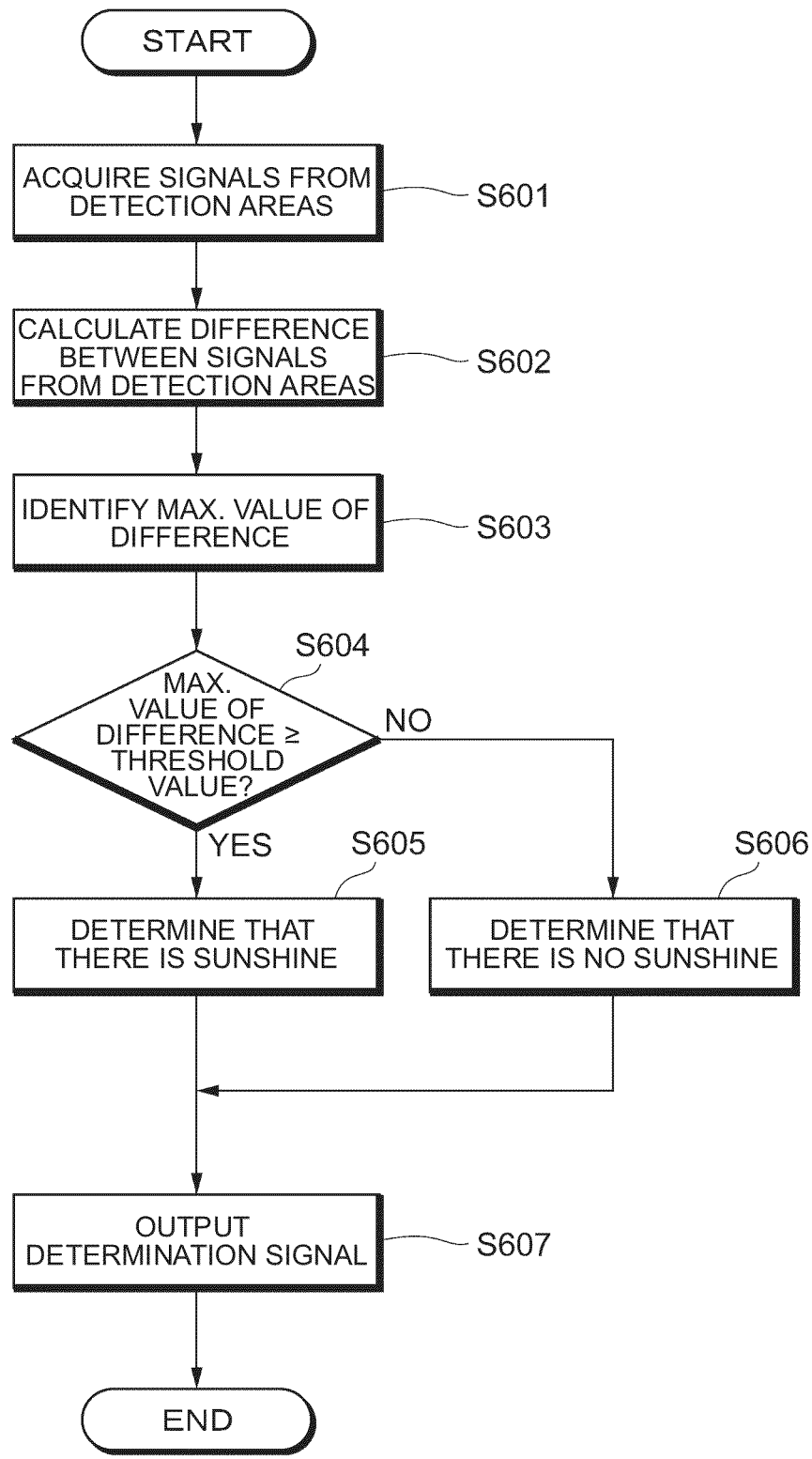
FIG. 6 is a flowchart illustrating the processing in the determination circuit according to the first embodiment.

Referring to FIG. 6, the sunshine measurement method performed by the determination circuit 104 on the basis of signals from the sensor 102 will be described. The method is a processing procedure repeatedly performed while the sunshine recorder 10 is in operation. The following calculation procedure is as described in detail in the description of the first measurement principle, and will be briefly described.

In step S601 of FIG. 6, the signal processing circuit 202 acquires the signal from each detection area of the sensor 102.

In step S602, the calculation circuit 203 calculates the difference between signals as a measurement value. The difference is calculated as an absolute value.

In step S603, the calculation circuit 203 identifies, as the maximum value of difference, a difference having a largest absolute value among a plurality of calculated differences.

In step S604, the calculation circuit 203 determines whether the maximum value of the difference is equal to or greater than a predetermined threshold value stored in the memory circuit 201.

When the determination result in step S604 is affirmative, then the calculation circuit 203 determines, in step S605, that there is sunshine at the time when the processing is being performed.

When the determination result in step S604 is negative, then the calculation circuit 203 determines, in step S606, that there is no sunshine at the time when the processing is being performed.

In step S607, the calculation circuit 203 outputs a determination signal on the basis of a determination result.

A specific processing example will now be described with reference to FIG. 7. FIG. 7 illustrates a case where the signals Q1, Q2, Q3, and Q4 are (9.5, 0.7, 0.9, and 0.8), respectively, and a case where the signals Q1, Q2, Q3, and Q4 are (0.2, 0.5, 0.3, and 0.4), respectively (unit: mV).

By the processing in step S602, the differences |Q1−Q2|, |Q1−Q3|, |Q1−Q4|, |Q2−Q3|, |Q2−Q4|, and |Q3−Q4| are calculated.

The maximum value of difference is identified by the processing in step S603. When the processing from step S604 to S606 indicates that the maximum value of difference is equal to or greater than the threshold value, then it is determined that there is sunshine, and when the processing indicates that the maximum value of difference is equal to or smaller than the threshold value, then it is determined that there is no sunshine. Here, a case where it is determined that there is sunshine and a case where it is determined that there is no sunshine are illustratively shown, but the determination result may change according to the threshold value.

Figure 8:
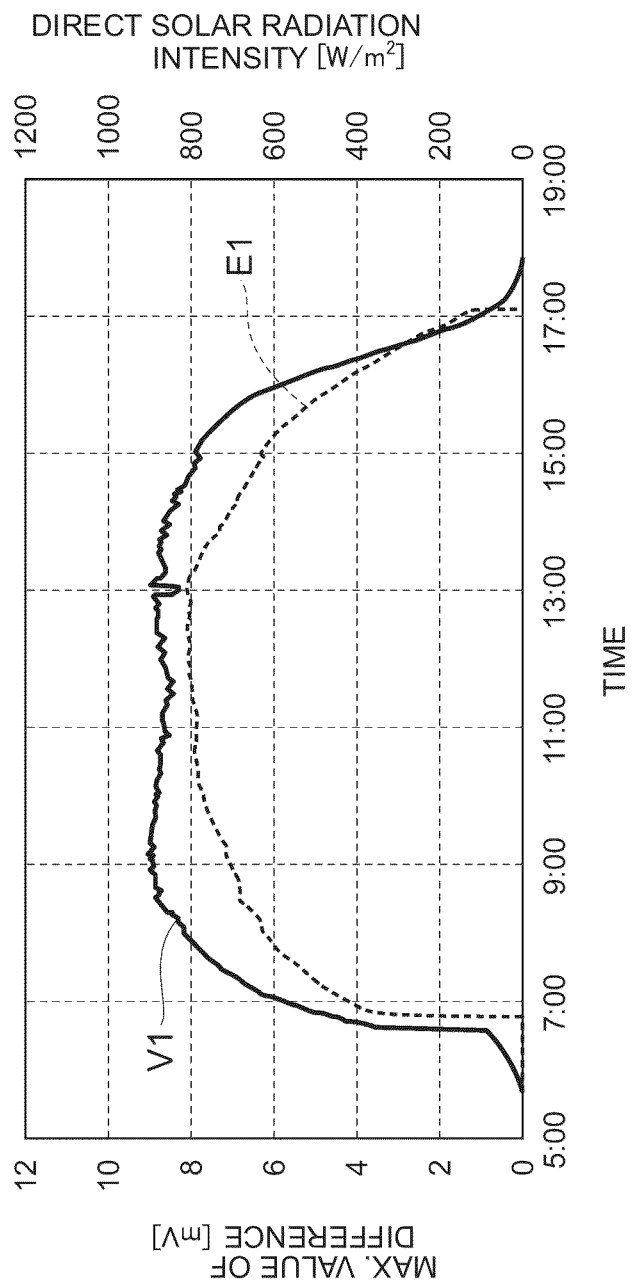
FIG. 8 is a diagram illustrating the results of the processing by the determination circuit according to the first embodiment.

FIG. 8 illustrates a curve V1 indicating the maximum value of a difference calculated on a day different from the day when the measurement of FIG. 5 was performed. As a comparative example, a curve E1 is also shown, which indicates the direct solar radiation intensity measured by a direct pyrheliometer mounted on a solar tracking device at the same time on the same day. From FIG. 8, it can be seen that the state of sunshine can be properly measured also with the maximum value of difference. Thus, the sunshine recorder 10 is capable of properly determining sunshine on the basis of the maximum value of difference.

In step S604, the calculation circuit 203 may consider a calibration value stored beforehand in the memory circuit 201 when determining whether the maximum value of difference is equal to or greater than a predetermined threshold value stored in the memory circuit 201.

Second Embodiment

A second embodiment based on the above-described second measurement principle will now be described. In the second embodiment, descriptions of matters common to the first embodiment will be omitted, and only different points will be described.

In the second embodiment, the components of a sunshine recorder 10 and the circuits of a determination circuit 104 are common to the first embodiment. The second embodiment is different in that the difference operation in the determination processing by the determination circuit 104 is performed by mutually comparing the differences based on the signals from four detection areas.

Figure 9:
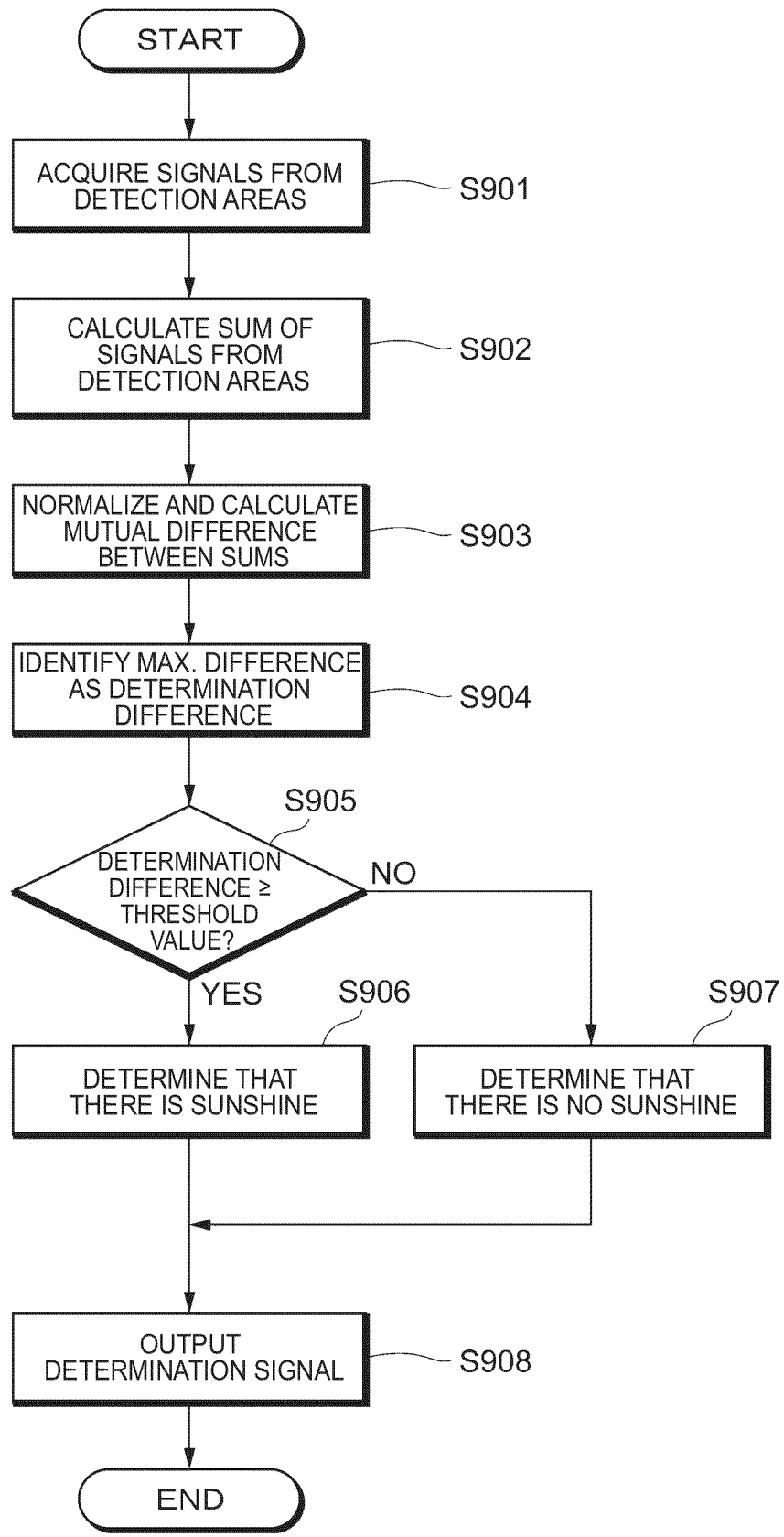
FIG. 9 is a flowchart illustrating the processing in a determination circuit according to a second embodiment.

FIG. 9 illustrates a flowchart of the sunshine measurement method by the determination circuit 104 according to the second embodiment. The following calculation procedure is as described in detail in the description of the second measurement principle, and will be briefly described.

In step S901, a calculation circuit 203 acquires a signal from each detection area.

In step S902, based on each signal, the calculation circuit 203 calculates the sum of the signals from the detection areas.

In step S903, the calculation circuit 203 normalizes and calculates the mutual difference between the sums. The differences are calculated as absolute values.

In step S904, the calculation circuit 203 identifies the difference having a maximum absolute value as the determination difference.

In step S905, the calculation circuit 203 determines whether the determination difference is equal to or greater than a predetermined threshold value.

When the determination result in step S905 is affirmative, then the calculation circuit 203 determines, in step S906, that there is sunshine at the time when the processing is being performed.

When the determination result in step S905 is negative, then the calculation circuit 203 determines, in step S907, that there is no sunshine at the time when the processing is being performed.

In step S908, the calculation circuit 203 outputs a determination signal on the basis of a determination result.

A specific processing example will now be described with reference to FIG. 10. FIG. 10 illustrates cases where the signals Q1, Q2, Q3, and Q4 are (9.5, 0.7, 0.9, and 0.8), (4.8, 0.5, 0.6, and 4.8), (4.8, 4.8, 0.5, and 0.6), (0.6, 4.8, 4.8, and 0.5), (0.5, 0.6, 4.8, and 4.8), and (0.2, 0.5, 0.3, and 0.4), respectively.

By the processing in step S902, the total value Q1+Q2 of the signals from a detection area R1 and a detection area R2, and the total value Q3+Q4 of the signals from a detection area R3 and a detection area R4 are calculated. By the processing in step S902, the total value Q1+Q4 of the signals from the detection area R1 and the detection area R4, and the total value Q2+Q3 of the signals from the detection area R2 and the detection area R3 are calculated as measurement values.

By the processing in step S903, the absolute value of the difference between the measurement values of the pair of the detection area R1 and the detection area R2 and the pair of the detection area R3 and the detection area R4 is normalized by the total value of Q1 to Q4 to calculate a difference $\Delta 1$. By the processing in step S903, the absolute value of the difference between the signals from the pair of the detection area R1 and the detection area R4 and the pair of the detection area R2 and the detection area R3 is normalized by the total value of Q1 to Q4 to calculate a difference $\Delta 2$. The differences $\Delta 1$ and $\Delta 2$ are calculated using the following equations:

$$\Delta 1 = \frac{|(Q1 + Q2) - (Q3 + Q4)|}{(Q1 + Q2 + Q3 + Q4)} \quad [\text{Math. 1}]$$

$$\Delta 2 = \frac{|(Q1 + Q4) - (Q2 + Q3)|}{(Q1 + Q2 + Q3 + Q4)}$$

By the processing in step S904, the difference $\Delta 1$ or the difference $\Delta 2$, whichever difference is greater is identified as the determination difference. This means that when $\Delta 1 \geq \Delta 2$, then $\Delta 1$ is identified as the determination difference, and when $\Delta 2 > \Delta 1$, then $\Delta 2$ is identified as the determination difference.

By the processing from step S905 to S907, it is determined that there is sunshine when the maximum value of difference is the threshold value (0.5) or more, and that there is no sunshine when the maximum value of difference is the threshold value or less.

The threshold value here is merely an example, and the threshold value can be appropriately set according to an environment.

The pairs of signals in the first and the sixth lines in FIG. 10 are the same as the pairs of signals according to the first embodiment shown in the first and the second lines in FIG. 7. This indicates that the presence or absence of sunshine is properly determined also by the sunshine recorder 10 according to the second embodiment.

Further, the pairs of signals in the second to the fifth lines in FIG. 10 respectively correspond to the case where the area DR2 is positioned between the detection area R1 and the detection area R4, the case where the area DR2 is positioned between the detection area R1 and the detection area R2, the case where the area DR2 is positioned between the detection area R2 and the detection area R3, and the area DR2 is positioned between the detection area R3 and the detection area R4. In any one of these cases, it is properly determined that there is sunshine. Thus, the sunshine recorder 10 according to the second embodiment is capable of properly determining the presence or absence of sunshine independently of the direction in which the sunshine recorder 10 is installed.

Figure 11:
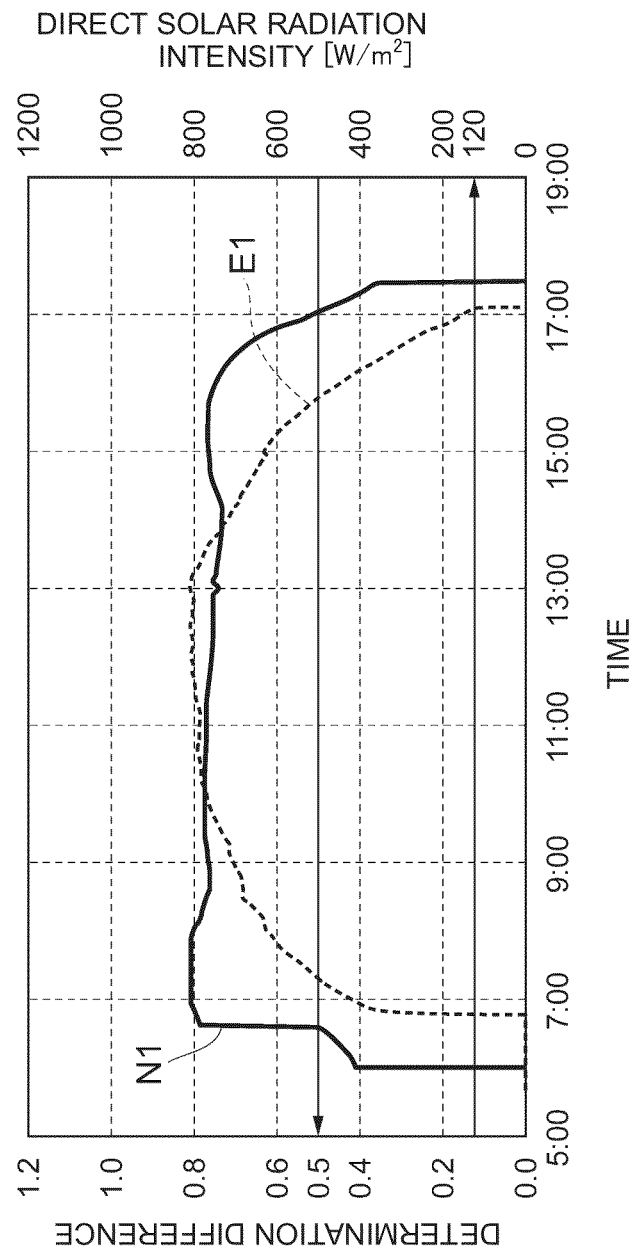
FIG. 11 is a diagram illustrating the results of the processing by the determination circuit according to the second embodiment.

FIG. 11 illustrates a curve N1 indicating the determination differences calculated on the day when the measurement in FIG. 8 was performed. As a comparative example, a curve E1 is shown, which indicates the direct solar radiation intensities measured by a direct pyrheliometer mounted on a solar tracking device at the same time on the same day. Referring to FIG. 11, it is determined that there is sunshine when a determination difference is 0.5 or more, and that there is sunshine when the direct solar radiation intensity exceeds 120 W/m². FIG. 11 indicates that the state of sunshine can be properly measured also by determination differences. In other words, FIG. 11 indicates that the determination of sunshine by the sunshine recorder 10 according to the second embodiment is equivalent to the determination of sunshine by the direct pyrheliometer mounted on a solar tracking device having a movable component and a more complicated configuration than that of the sunshine recorder 10. Thus, it has been demonstrated that the sunshine recorder 10 according to the present embodiment is capable of properly determining the presence or absence of sunshine on the basis of a determination difference without being provided with any movable components.

FIG. 12 illustrates (A) a state of sunshine determined on the basis of the determination differences indicated by the curve N1 in FIG. 11, and (B) a state of sunshine determined on the basis of the direct solar radiation intensities indicated by the curve E1 in FIG. 11. When the value on the vertical axis is 1, then there is sunshine, and when the value on the vertical axis is 0, then there is no sunshine. As illustrated in FIG. 12, the sunshine recorder 10 according to the second embodiment properly determines the presence or absence of sunshine in the same manner as a direct pyrheliometer mounted on a solar tracking device. In this case, an external device 206 calculates time T1 as sunshine duration.

FIG. 13 illustrates (A) a state of sunshine determined on the basis of determination differences on another day, and (B) a state of sunshine determined on the basis of direct solar radiation intensities on the same day. In both cases, it is indicated that the sun was hidden by clouds or the like for a certain period of time. As shown in FIG. 13, the sunshine recorder 10 according to the second embodiment properly determines presence or absence of sunshine in the same manner as the direct pyrheliometer mounted on a solar tracking device even if sunshine is interrupted. In this case, the external device 206 calculates sunshine duration as the total value of time determined to have sunshine.

Third Embodiment

Figure 14:
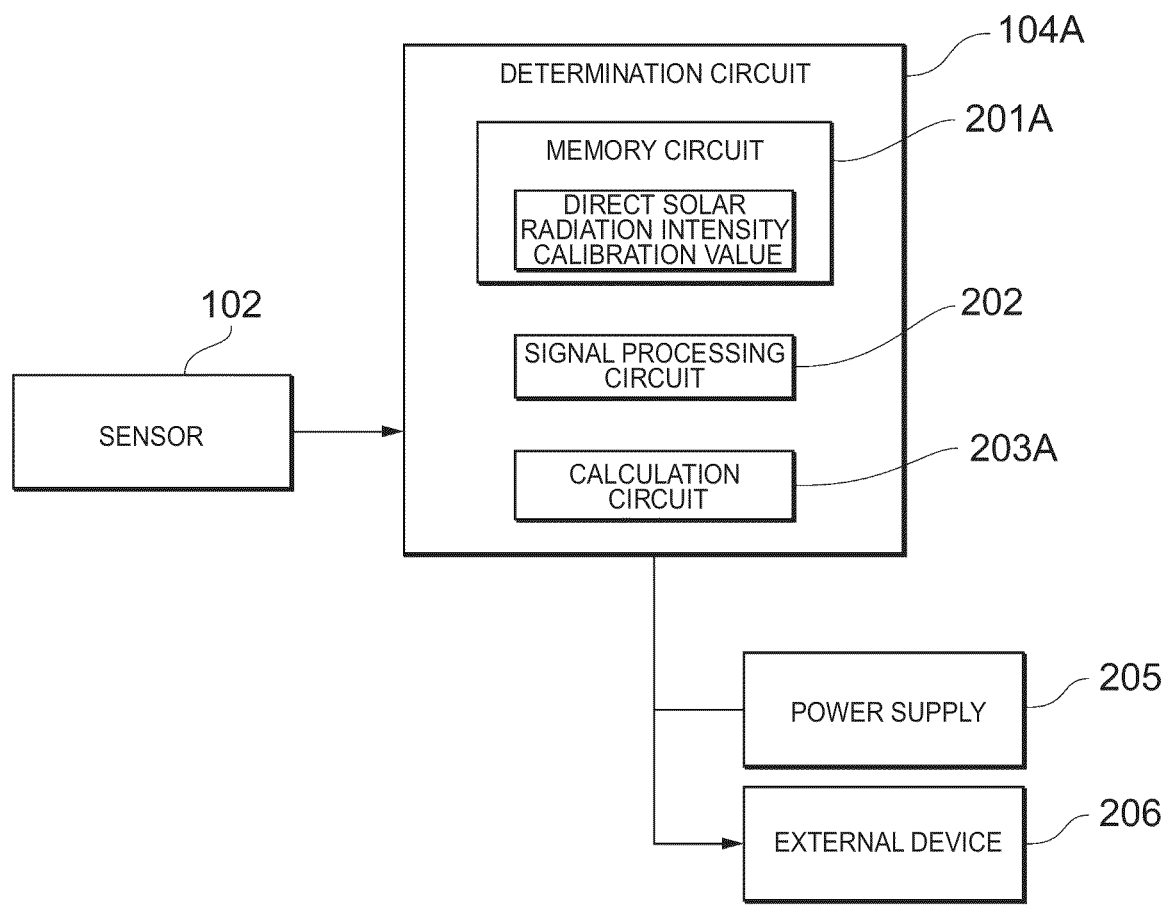
FIG. 14 is a block diagram illustrating a determination circuit according to a third embodiment.

A third embodiment will be described. A sunshine recorder according to the third embodiment is capable of computing direct solar radiation intensities in addition to determining presence or absence of sunshine described in the first embodiment and the second embodiment. The sunshine recorder according to the third embodiment has the same structure as that of the sunshine recorder 10 illustrated in FIG. 3, but is different from the sunshine recorder 10 in that the determination circuit 104 has been replaced by a determination circuit 104A illustrated in FIG. 14.

The determination circuit 104A has a memory circuit 201A, a signal processing circuit 202, and a calculation circuit 203A. The determination circuit 104A is implemented as a circuit in a microcomputer including the memory circuit 201A and the signal processing circuit 202. The calculation circuit 203A is a functional block implemented by the microcomputer executing a software program stored in the memory circuit 201A.

The memory circuit 201A stores calibration values for calculating direct solar radiation intensities in addition to information stored in the memory circuit 201A. The calculation circuit 203A performs operations for calculating direct solar radiation intensities in addition to operations performed by the calculation circuit 203.

A description will be given of the calculation of direct solar radiation intensities performed by the calculation circuit 203A. The calculation circuit 203A performs the difference operation based on the above-described second measurement principle to calculate a first difference and a second difference. The calculation circuit 203A defines the first difference or the second difference, whichever difference has a greater absolute value, as a determination difference D. The determination difference D may be a normalized value like the differences Δ1 and Δ2 in the second embodiment, or may not be a normalized value. Here, the description will be given on the assumption that the determination difference D is not normalized.

The calculation circuit 203A performs the same processing as that from step S901 to step S904 in FIG. 9 to calculate the determination difference D.

The calculation circuit 203A calculates the direct solar radiation intensity by the following equation:

$$\text{Direct solar radiation intensity } f(\theta) = \frac{\text{Determination difference } D \cdot k}{\left(\alpha_1 \cdot \theta^n + \alpha_2 \cdot \theta^{n-1} + \ldots + \alpha_{n-1} \cdot \theta^1 + \alpha_n\right)} \quad \text{[Math. 2]}$$

where θ denotes a solar elevation angle (°). The calculation circuit 203A calculates the solar elevation angle θ on the basis of the latitude and longitude of the location where the sunshine recorder is installed and the time at the location. $\alpha_1$ to $\alpha_n$ denote coefficients at individual orders when the angular characteristics of a lens 101 are measured and the output values of a sensor 102 with respect to angles are subjected to polynomial approximation. k denotes a sensitivity constant, and the dimension thereof is [W/m²]. The coefficients $\alpha_1$ to $\alpha_n$ and the sensitivity constant k are stored in the memory circuit 201A as calibration values.

Here, the sensitivity constant k is calculated as shown below, using, for example, a direct solar radiation intensity β calculated using a direct pyrheliometer mounted on a solar tracking device, and the determination difference D, the solar elevation angle θ calculated by the sunshine recorder according to the present embodiment, and the coefficients $\alpha_1$ to $\alpha_n$.

$$k = \frac{\left(\alpha_1 \cdot \theta^n + \alpha_2 \cdot \theta^{n-1} + \ldots + \alpha_{n-1} \cdot \theta^1 + \alpha_n\right) \cdot \beta}{\text{Determination difference } D} \quad \text{[Math. 3]}$$

Figure 15:
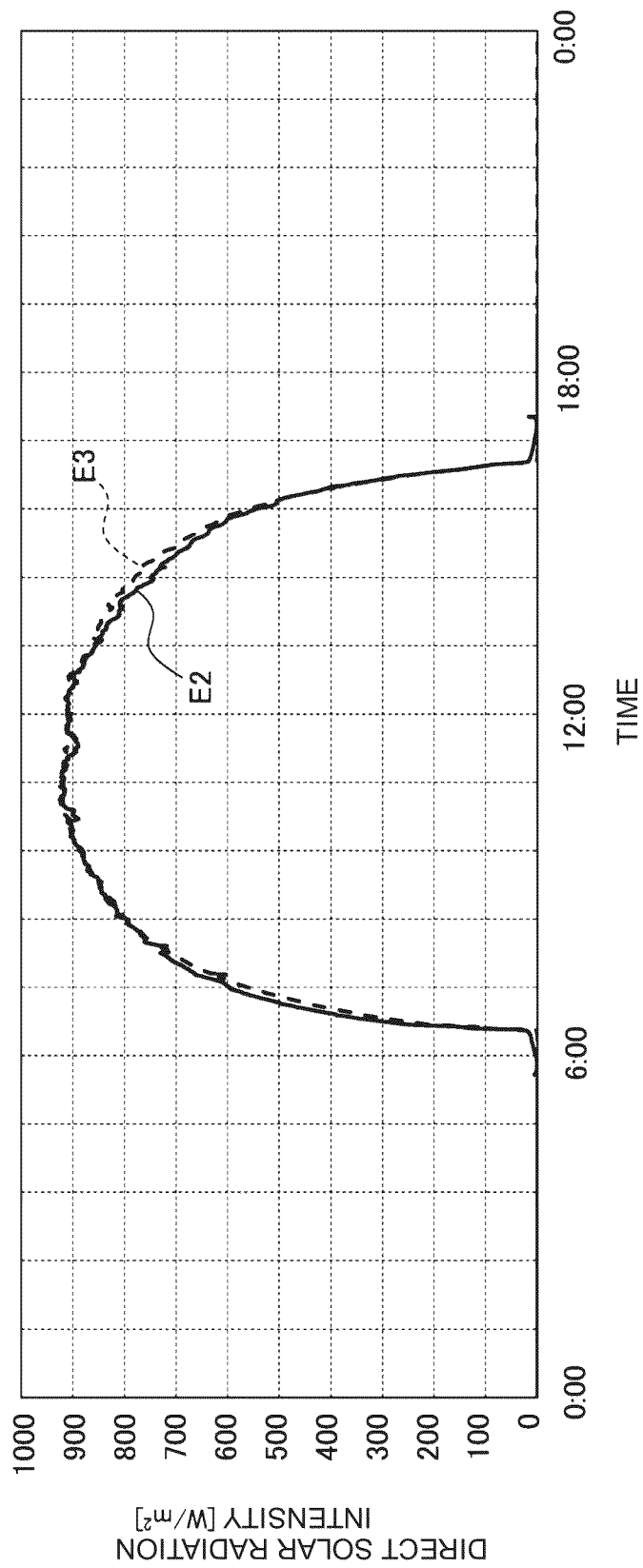
FIG. 15 is a diagram illustrating the direct solar radiation intensities calculated by the determination circuit according to the third embodiment.

FIG. 15 illustrates a curve E2 showing a direct solar radiation intensity calculated by the calculation circuit 203A at a certain time and date on the basis of the determination difference D, the solar elevation angle θ, the coefficients $\alpha_1$ to $\alpha_n$, and the sensitivity constant k, and a curve E3 showing a direct solar radiation intensity measured at the same time on the same day by a direct pyrheliometer mounted on a solar tracking device. FIG. 15 shows that the direct solar radiation intensity calculated by the sunshine recorder 10 according to the third embodiment is equivalent to the direct solar radiation intensity calculated by the direct pyrheliometer mounted on the solar tracking device having a more complicated configuration because of the inclusion of a movable component and the like than that of the sunshine recorder 10 of the third embodiment. Thus, it has been demonstrated that the sunshine recorder 10 of the third embodiment is capable of properly performing the calculation of direct solar radiation intensities based on determination differences without being provided with any movable components.

Modified Example

A modified example of the above-described embodiments will be described. In the first embodiment, for example, in the sensor 102 having the light receiving surface RS divided into the detection areas R1, R2, R3 and R4, direct light may be incident on the boundaries of the detection areas. The boundaries of the detection areas are dead regions with no element of the sensor 102. The dead regions are, for example, rectangular areas having a width of approximately several μm to 100 μm, and no direct light and scattered light are detected in the boundaries of the detection areas. Consequently, it may be difficult to detect direct light when the direct light is incident on the boundaries of the detection areas. In the present modified example, a description will be given of a sunshine recorder capable of detecting a direct light component even if the sensor 102 has the dead regions.

Figure 16:
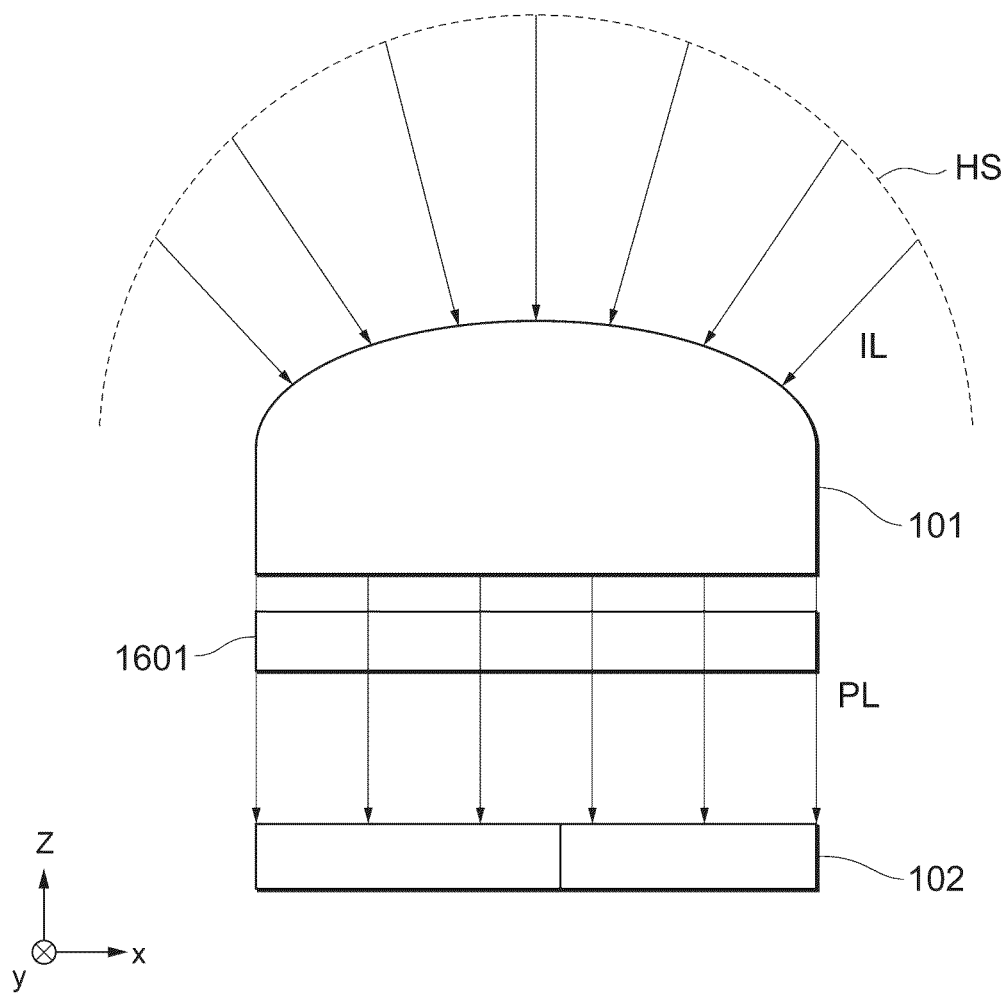
FIG. 16 is a schematic diagram illustrating the measurement by a sunshine recorder according to a modified example.

The sunshine recorder according to the present modified example solves the problem related to the dead regions by blurring an image formed on the sensor 102 by direct light incident on the sensor 102. FIG. 16 illustrates an example of the concept of the sunshine recorder capable of blurring an image on the sensor 102.

FIG. 16 is a diagram schematically illustrating from the side a lens, a sensor, and a diffusion plate according to the present modified example. As with FIG. 1, FIG. 16 illustrates a situation in which natural light IL, which is sunlight, is incident on a lens 101 from half of the celestial sphere HS, and projection light PL is emitted to the sensor 102 from the lens 101. In the present modified example, a diffusion plate 1601 is provided between the lens 101 and the sensor 102. The diffusion plate 1601 scatters the projection light PL when light from the lens 101 passes therethrough. By the diffusion plate 1601, the projection light PL that has been scattered is projected onto the sensor 102.

By scattering the projection light from the lens 101, an image formed on the sensor 102 by direct light can be blurred. This makes it possible to prevent direct light from reaching only the dead regions of the sensor 102, and to allow the direct light to be detected by the elements of the sensor 102. Thus, even in the case where the sensor 102 has dead regions, direct light components can be detected.

The configuration for blurring an image formed on the sensor 102 by direct light is not limited to the method using a diffusion plate. For example, in FIG. 3, forming a cover 1013 by frosted glass that diffuses light rather than transparent glass makes it possible to blur an image on the sensor 102. Further, using frosted glass to form an incident surface 1011 or an emitting surface 1012 of the lens 101 also makes it possible to blur an image on the sensor 102. Alternatively, an image on the sensor 102 can be blurred by installing the sensor 102 at a distance that is different from the focal length of the lens 101. In an optical device such as a sunshine recorder, there are cases where importance is attached to properly installing a sensor at the focal length of a lens thereby to ensure that light reaches in a straight line. Contrary to such technical common sense, the present modified example solves the problem related to the dead regions by changing the mindset, and adopts the configuration for intentionally blurring images.

In addition to the configuration for blurring images as described above, another configuration for solving the problem related to the dead regions will be described. For example, by placing a reflection member such as a mirror that reflects light or a refraction member that refracts light in the dead regions, the direction of light that would reach the dead regions can be adjusted such that the light travels toward the light receiving areas of the sensor 102. According to the configuration, it is possible to prevent light from reaching the dead regions, thus solving the problem related to the dead regions. Alternatively, the problem related to the dead regions can be solved by configuring the sunshine recorder 10 to be eccentrically drivable by a drive device or the like, thereby enabling the sunshine recorder 10 to be moved so as to prevent light from reaching the dead regions. Alternatively, the problem related to the dead regions can be solved by performing operations to reduce the influences of the dead regions according to outputs of the sensor 102 in the case where light reaches the dead regions.

The embodiments described above are intended for easy understanding of the present invention, and should not be interpreted to limit the present invention. The elements provided in the embodiments, and the placement, the materials, the conditions, the shapes, the sizes, and the like of the elements are not limited to those illustrated, but can be changed as appropriate. Further, the configurations shown in different embodiments can be partly replaced or combined.

REFERENCE SIGNS LIST

10 . . . sunshine recorder; 101 . . . lens; 102 . . . sensor; 103 . . . housing; 104, 104A . . . determination circuit; 201, 201A . . . memory circuit; 202 . . . signal processing circuit; 203, 203A . . . calculation circuit; R1, R2, R3, and R4 . . . detection area; and 1601 . . . diffusion plate.

What is claimed is:

1. A sunshine recorder comprising:
   a lens that emits, as projection light, natural light incident from half of the celestial sphere;
   a sensor that photoelectrically converts the projection light projected onto a light receiving surface, and outputs the photoelectrically converted projection light; and
   a determination circuit that determines the presence or absence of sunshine on the basis of an output of the sensor,
   wherein the sensor has a plurality of detection areas on the light receiving surface, and is configured to output a signal corresponding to an intensity of the projection light incident on each of the detection areas, and
   the determination circuit removes a scattered light component included in the projection light on the basis of a difference operation of the signal output from each of the detection areas to extract only a direct light component to be included in the projection light at the time of incidence of sunlight, thereby determining the presence or absence of sunshine in the natural light.

2. The sunshine recorder according to claim 1,
   wherein the determination circuit determines that there is the sunshine in the case where a maximum value of differences between signals output from the detection areas satisfies a predetermined threshold value.

3. The sunshine recorder according to claim 2,
   wherein the sensor has four detection areas,
   the determination circuit determines the presence or absence of sunshine by mutually comparing a difference between a sum of signals from the detection areas provided side by side in a predetermined first direction and a sum of signals from the detection areas provided side by side in a second direction orthogonal to the first direction.

4. The sunshine recorder according to claim 1,
   wherein the determination circuit outputs a determination signal indicating the presence or absence of sunshine.

5. The sunshine recorder according to claim 1,
   wherein the determination circuit further refers to a predetermined calibration value to determine the presence or absence of sunshine.

6. The sunshine recorder according to claim 1,
   wherein the determination circuit calculates a direct solar radiation intensity on the basis of the direct light component and a direct solar radiation intensity calibration value.

7. The sunshine recorder according to claim 6,
   wherein the determination circuit outputs the direct solar radiation intensity.

8. A sunshine measurement method comprising:
   emitting, as projection light, natural light incident from half of the celestial sphere;
   outputting signals corresponding to intensities of projection light incident on a plurality of detection areas on a light receiving surface for the projection light; and
   determining the presence or absence of sunshine in the natural light by removing a scattered light component included in the projection light on the basis of a difference operation of signals output from the detection areas so as to extract only a direct light component to be included in the projection light at the time of incidence of sunlight.

* * * * *